(12) United States Patent
Manson et al.

(10) Patent No.: US 11,146,193 B2
(45) Date of Patent: Oct. 12, 2021

(54) GENSET ENGINE PARALLELING CONTROLS, DEVICES, SYSTEMS, AND METHODS

(71) Applicant: Schweitzer Engineering Laboratories, Inc., Pullman, WA (US)

(72) Inventors: Scott M. Manson, Moscow, ID (US); Ellery A. Blood, Moscow, ID (US); Gregory C. Zweigle, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 0 days.

(21) Appl. No.: 17/068,414

(22) Filed: Oct. 12, 2020

(65) Prior Publication Data
US 2021/0111651 A1  Apr. 15, 2021

Related U.S. Application Data

(60) Provisional application No. 62/914,954, filed on Oct. 14, 2019.

(51) Int. Cl.
| | |
|---|---|
| H02P 9/10 | (2006.01) |
| H02P 9/04 | (2006.01) |
| F02D 31/00 | (2006.01) |
| F02B 63/04 | (2006.01) |
| H02P 101/25 | (2016.01) |

(52) U.S. Cl.
CPC .............. *H02P 9/105* (2013.01); *F02B 63/04* (2013.01); *F02D 31/007* (2013.01); *H02P 9/04* (2013.01); *H02P 9/102* (2013.01); *H02P 2101/25* (2015.01)

(58) Field of Classification Search
CPC .. H02P 9/105; H02P 9/04; H02P 9/102; H02P 2101/25; F02B 63/04; F02D 31/007
See application file for complete search history.

(56) References Cited

U.S. PATENT DOCUMENTS 6,348,743 B1 * 2/2002 Sakasai ................. H02P 9/04
                                                    290/40 A
8,068,937 B2   11/2011 Eaves
(Continued)

OTHER PUBLICATIONS

Elif Uysal-Biyikoglu, et. al "Energy-Efficient Packet Transmission Over a Wireless Link", IEEE/ACM Transactions on Networking, vol. 10, No. 4, Aug. 2002.
(Continued)

*Primary Examiner* — Sean Gugger
(74) *Attorney, Agent, or Firm* — Stoel Rives LLP (57) ABSTRACT

A device to control a genset engine may use multiple feedback loops to provide a fast stable response to load changes. An outer feedback loop may receive frequency measurements and power measurements of a genset engine and determine a dispatch adjustment comprising a frequency setpoint based on the frequency measurements and power measurements. A middle feedback loop may comprise a double deadband droop filter that periodically generates a pulse based on the frequency setpoint and the power measurements. The middle feedback loop may update an inner loop setpoint based on the pulse. An inner feedback loop may alter a target fuel valve reference of the genset engine based on the inner loop setpoint generated by the second controller and a fuel valve droop.

21 Claims, 5 Drawing Sheets

(56) References Cited

U.S. PATENT DOCUMENTS

| | | | |
|---|---|---|---|
| 8,275,488 | B2 | 9/2012 | Kim |
| 9,184,795 | B2 | 11/2015 | Eaves |
| 9,574,511 | B2 | 2/2017 | Kim |
| 9,753,096 | B2 | 9/2017 | Kim |
| 9,853,689 | B2 | 12/2017 | Eaves |
| 9,906,041 | B2 | 2/2018 | Ravikumar |
| 9,912,158 | B2 | 3/2018 | Ravikumar |
| 2004/0008010 | A1 | 1/2004 | Ibrahim |
| 2010/0038907 | A1 | 2/2010 | Hunt |
| 2012/0138582 | A1 | 6/2012 | Radtke |
| 2012/0312276 | A1* | 12/2012 | Furuichi ............ F02M 37/0052 123/395 |
| 2020/0111176 | A1 | 4/2020 | Schweitzer |

OTHER PUBLICATIONS

Erol Gelenbe, et. al "Central or Distributed Energy Storage for Processors with Energy Harvesting", 2015 Sustainable Internet and ICT for Sustainability (SustainIT), IEEE, Apr. 2015.

Erol Gelenbe and Elif Tugce Ceran "Energy Packet Networks with Energy Harvesting", IEEE Access, vol. 4, Mar. 2016.

A. Monti, et. al "Towards a Real Digital Power System an Energy Packet Approach", 2017 IEEE Conference on Energy Internet and Energy System Integration (E12), Nov. 2017.

Roberto Rojas-Cessa, et. al "An Energy Packet Switch for Digital Power Grids", 2018 IEEE International Conference on Internet of Things (iThings) and IEEE Green Computing and Communications (GreenCom) and IEEE Cyber, Physical and Social Computing (CPSCom) and IEEE Smart Data (SmartData), Jul. 2018.

Van Smon, et al "Local Voltage-Stability Index Using Tellegen's Theorem", IEEE Transactions on Power Systems, vol. 21. No. 3, Aug. 2006.

Engineering Institute of Technology "Fundamentals of Smart Metering—kWh and kVArh Meters" Article [online], Jul. 13, 2017 [retrieved Dec. 3, 2019], Retrieved from <URL:https:www.eit.edu.au/cms/resources/technical-resourses/fundamentals-of-smater-metering-kwh-and-kvarh-meters-2>.

Schneider Electric "PowerLogic-™ PM5100 Series Power and Energy Meter" User Manual [online], Mar. 2017 [retrieved Dec. 4, 2019], Retrieved from <URL: https://download.schneider-electric.com/files?p_enDocType=User+guide&p_File_Name=EAV15105-EN05.pdf&p_Doc_Ref=EAV15105-EN>.

Yokogawa "How to Measure Electrical Power" Article [online]. 2017 [retrieved Dec. 4, 2019]. Retrieved from <URL:https://tmi.yokogawa.com/US/library/resources/application-notes/how-to-measure-electrical-power/>.

PCT/US2020/055250 International Search Report and Written Opinion of the International Searching Authority dated Jan. 22, 2021.

G.C. Gant, G.J. Alves "Progress in Electronic Control of Large Diesel Engines", Transactions of the ASME, Jul. 1990, p. 280-286, vol. 112.

Tomohiro Iwai, et al. "The Development of an Electronic Governor for the Power Generator System", SAE Technical Paper Series, Sep. 1990, Society of Automation Engineers, Inc.

Mnghui Kao, John J. Moskwa "Nonlinear Diesel Engine Control and Cylinder Pressure Observation" Journal of Dynamic Systems, Measurement and Control, Jun. 1995, p. 183-192, vol. 117.

Kiyong Kim, Jeff Burnworth "Load Anticipation Feature and Its Tuning Method for a Diesel Generating Set" 2016 Clemson University Power Systems Conference (PSC), Mar. 2016. IEEE, Clemson, SC, USA.

Wenhua Liu, et al. "Integrated Optimal Control of Speed, Excitation and Load Sharing of Parallel Operating Diesel Generator Sets" IEE 2nd International Conference on Advances in Power System Control, Operation and Management, Dec. 1993, p. 142-146, IEE, Hong Kong.

\* cited by examiner

GENSET ENGINE PARALLELING CONTROLS, DEVICES, SYSTEMS, AND METHODS

RELATED APPLICATIONS

This application claims priority to U.S. Provisional Application No. 62/914,954, filed Oct. 14, 2019 and entitled GENSET ENGINE PARALLELING CONTROL, which is hereby incorporated by reference herein in its entirety.

TECHNICAL FIELD

The present disclosure relates to controlling a generator.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

To operate a power grid, it is necessary to configure and control electrical generators such that they can be interconnected while sharing the power load and remaining dynamically stable. Many of the techniques used for large terrestrial power grids do not work well for smaller, islanded networks. For example, the terrestrial power grid operates individual machines on a local frequency droop methodology while wide area frequency control algorithms restore frequency and desired load share values. The large inertia and loose/flexible coupling of the terrestrial grid enables the fast droop control to be effectively decoupled from the wide-area controls by operating with a slow feedback loop. The frequency error and/or load share error can be slowly accumulated to adjust the respective machine control signals to respond to disturbances. This slow operation results in minimal interaction between the fast dynamics of local machine control and the slow dynamics of wide area frequency control.

Droop speed control is a control scheme used to control the power output of electrical power generators. An electrical power generator with a droop controller controls the power output based on the relationship between frequency and power. More specifically the relationship is that the power output of a generator reduces as the line frequency increases. Thus, a droop controlled electrical power generator works by controlling the rate of power produced by the prime mover according to the grid frequency.

The concept of droop control goes back to the beginning of steam engines. When an engine picks up load or goes up a hill the rapid load increase initiates a drop in frequency. The action of a governor gradually recovers the machine frequency by adjusting the fuel flow rate to reach steady state with the new load. Sometimes the original frequency (engine speed) is restored, sending the droop controls a larger steady-state frequency setpoint.

The act of slowing down an engine proportional to a change in load was originally a result of older governor technology (flywheel/weight devices). However, today it is a contractual requirement for interconnecting a generator set, PV, or battery system to a utility power system. Several droop techniques have been used. Explanations of some of these droop techniques is found below as well as an explanation of the techniques' limitations.

Natural Droop: A natural droop control loop may be associated with a mechanical ball/inertial valve speed governor. Mechanical ball/inertial valve speed governors have been employed since the invention of the steam engine, and were adapted to control frequency of alternating current generators. They are still in large use today on kW size generators and large scale hydroelectric plants, as well as a few steam plants. These methods are very reliable, simple, and time-proven. These speed regulators allowed paralleling because they naturally had a droop line. The gain of these regulators is inverse to the droop line. For example, a gain of 20 pu MW/pu Hz is a droop of $1/20=0.05=5\%$. These systems had only a proportional term which acts also as the inverse of droop. Such a system is commonly called a natural droop controller. The downside to these controllers is that the droop lines are nonlinear (power does not have a direct linear relationship to valve position), non-repeatable, include a lot of hysteresis, and the gain is limited by the droop.

Valve reference droop: A valve reference droop represents a digital improvement of the natural droop systems. In this case, the engine speed is measured in rotations per minute (RPM), most commonly by a tooth wheel sensor. The engine speed reference at zero power and 60 Hz power system is 1800 RPM for a four pole generator and direct shaft between the generator and engine. A droop of 0.05 (5%) is created by multiplying the fuel valve reference by 0.05 and subtracting the product from a speed feedback signal. This form of droop has an advantage of decoupling proportional-integral-derivative (PID) tuning from the droop term, making the machines much faster in response than natural droop systems. However, a downside to a valve reference droop is that the droop line is still very nonlinear, hysteretic, and error prone. For example, for a diesel engine the relationship between a fuel valve reference and actual power output is highly affected by fuel quality, fuel temperature, engine temperature, lubrication, air pressure, and more.

Metered Droop: Using a metered droop control method, the valve reference, used with a valve reference droop controller, is replaced with a power meter signal. The advantage to this is that the droop line is now linear and repeatable. Unfortunately, the lag in measuring electric power for most of these systems was over 1 second, making for poor dynamic performance and load sharing. Because of this delay, PID gains are limited and dynamic performance of this system is slower than the natural droop and valve reference droop techniques. Worsening this effect is that some systems use frequency instead of RPM. RPM is measured on most machines at several dozen times per revolution of the engine. The frequency can be derived from measurements of the electrical waveform, however these tend to be noisy and require averaging the measurements over 10 cycles, making the total dynamic performance of this system very poor as compared to valve and natural droop control systems.

Power loop with frequency droop: This control loop is used for many of the steam driven turbines in the world. Mathematically it appears similar to a metered droop, however, as proven through rigorous sensitivity analysis and field data collection, this form of control loop is subject to large pole pair movements as a function of changes in load composition. In other words, this turbine control method goes unstable easily when the load composition changes from motors to electronic loads. Electronic loads, which are often constant power, tend to have an inverse voltage/Power relationship, an inverse voltage/reactive power relationship, and no sensitivity frequency changes, which is the opposite of the resistive and inductive machine loads that these control methods were designed to supply. For example, a direct connected induction machine with pump or compressor loads change an associated load as a frequency squared or cubed relationship, which serves to stabilize engine controls; power electronic loads have no such relationship to aid in stabilization. This instability is not present in any of the other types of droop controls. This form of control loop may be appropriate for large power systems, but is completely inappropriate for small microgrids or distributed generation.

Smaller grids (e.g., tactical or industrial microgrids) tend to have much less inertia than large terrestrial power grids and the components are much more tightly coupled. The tight coupling results in a system in which the generator controllers are difficult to tune in such a way that they are both responsive (i.e., respond quickly to disturbances to restore acceptable load share and restore system frequency) and stable (i.e., not susceptible to growing oscillations). Load share and frequency control algorithms have partially overcome this difficulty by relying on rapid and frequent communication between individual generator controllers. Loss of communications can, however, result in instability and potential equipment damage. Systematic machine controller tuning is still required for acceptable performance of dissimilar machines. Expert tuning by specially trained engineers is typically necessary at a significant expense of money and time. As such, many customers opt to compose their microgrid solely of identical machines to reduce the machine tuning burden.

Furthermore, the aforementioned control strategies were developed when power system loads were primarily resistive (e.g., incandescent lighting or resistive heaters) and inductive (e.g., motors and long transmission lines). These loads tend to increase power demands on the generators as voltage and frequency increase. Recently, the load composition of the power grid contains a significant proportion of loads that act as constant power loads (e.g., computers and LED lighting). These loads, conversely, tend to increase power demands on the generators as voltage decreases, and tend to be unresponsive to frequency changes. These changing load dynamics further complicate the already difficult methods of tuning generator controllers.

Embodiments herein provide systems, devices, and methods for local control of parallel engines in a microgrid. The embodiments herein may provide stability even with communication failure between controllers, reduce problems associated with conventional integral control methods, and reduce gain sensitivity to load composition and inertia. The embodiments herein resolve the challenges outlined above by using multiple control loops. The control loops may be referred to herein as controllers or controller stages. In some embodiments, an outer control loop provides dispatch instructions based on wide-area feedback. In some embodiments, a middle control loop shapes the dispatch instructions via a double deadband droop controller, and isolates an inner control loop from the outer control loop. The inner control loop provides rapid response to frequency changes for an individual machine.

The phrases "coupled to," "connected to," and "in communication with" refer to any form of interaction between two or more components, including mechanical, electrical, magnetic, and electromagnetic interaction. Two components may be connected to each other, even though they are not in direct contact with each other, and even though there may be intermediary devices between the two components.

As used herein, the term intelligent electronic device (IED) may refer to any microprocessor based device that monitors, controls, automates, and/or protects monitored equipment within a system. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, motor drives, and the like. IEDs may be connected to a network, and communication on the network may be facilitated by networking devices including, but not limited to, multiplexers, routers, hubs, gateways, firewalls, and switches. Furthermore, networking and communication devices may be incorporated in an IED or be in communication with an IED. The term IED may be used interchangeably to describe an individual IED or a system comprising multiple IEDs.

Aspects of certain embodiments described herein may be implemented as software modules or components. As used herein, a software module or component may include any type of computer instruction or computer-executable code located within or on a computer-readable storage medium, such as a non-transitory computer-readable medium. A software module may, for instance, comprise one or more physical or logical blocks of computer instructions, which may be organized as a routine, program, object, component, data structure, etc., that perform one or more tasks or implement particular data types, algorithms, and/or methods.

A particular software module may comprise disparate instructions stored in different locations of a computer-readable storage medium, which together implement the described functionality of the module. Indeed, a module may comprise a single instruction or many instructions, and may be distributed over several different code segments, among different programs, and across several computer-readable storage media. Some embodiments may be practiced in a distributed computing environment where tasks are performed by a remote processing device linked through a communications network. In a distributed computing environment, software modules may be located in local and/or remote computer-readable storage media. In addition, data being tied or rendered together in a database record may be resident in the same computer-readable storage medium, or across several computer-readable storage media, and may be linked together in fields of a record in a database across a network.

The embodiments of the disclosure can be understood by reference to the drawings, wherein like parts are designated by like numerals throughout. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments. In addition, the steps of a method do not necessarily need to be executed in any specific order, or even sequentially, nor need the steps be executed only once, unless otherwise specified.

Figure 1:
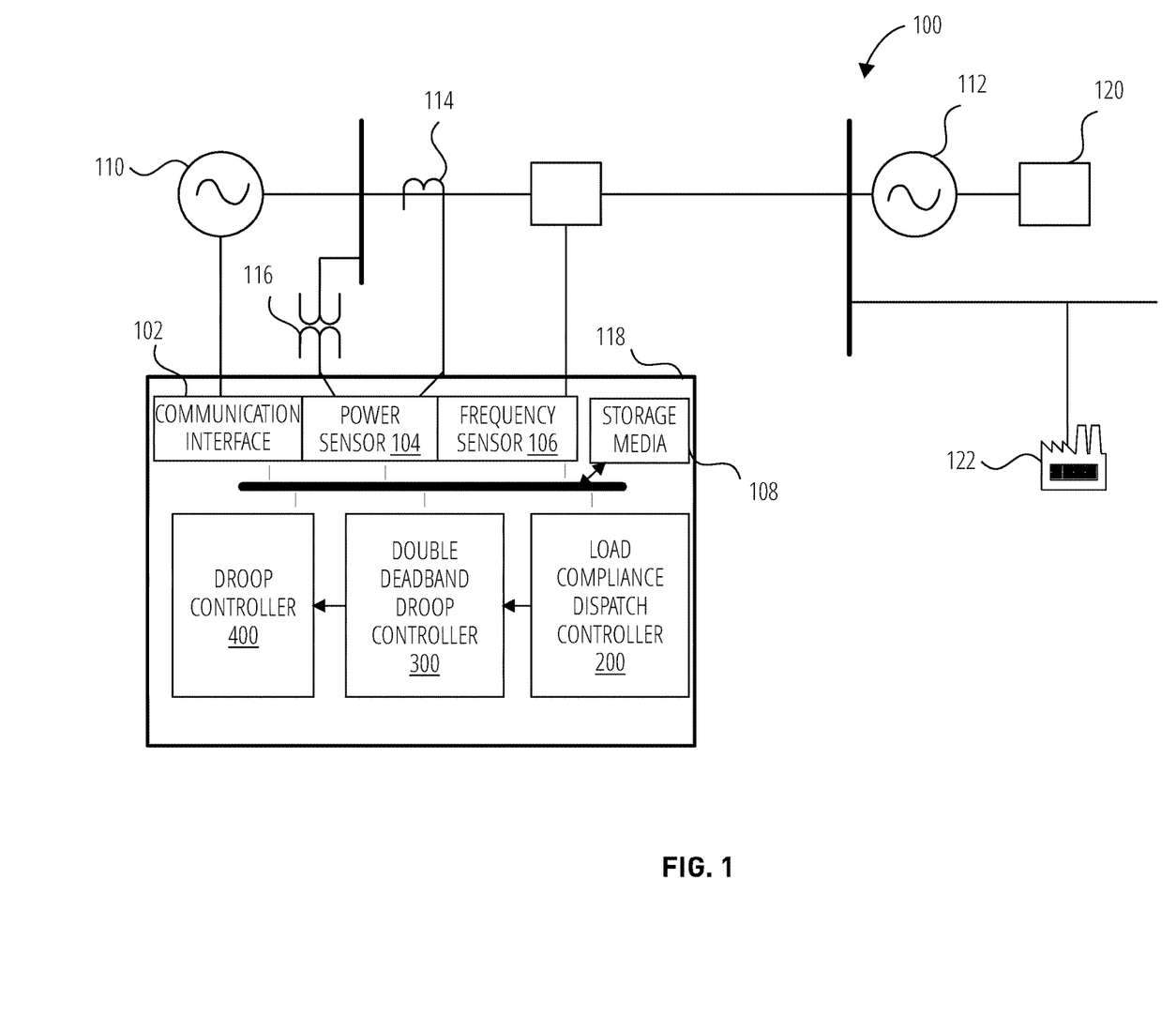
FIG. 1 illustrates an electric power delivery system in accordance with one embodiment.

FIG. 1 is a block diagram of an electric power delivery system 100 including an intelligent electronic device (IED 118) for controlling a machine (e.g., a generator 110).

Electric power delivery systems have been designed for the safe and reliable generation, transmission, and distribution of electric power to consuming loads. The electric power delivery system 100 comprises various equipment such as the one or more electric power generators (e.g., generator 110, generator 112), buses, transmission lines, transformers, smart distribution nodes, distribution lines, and the like for generating, transmitting, and delivering energy to a load 122.

Adding the IED 118 that is capable of controlling the generator 110 may result in fast and reliable power output changes in response to a load change. While the illustrated embodiment includes a single IED that includes three controllers (i.e., a droop controller 400, a double deadband droop controller 300, and a load compliance dispatch controller 200), these controllers may be separated into multiple IEDs. Additionally, the droop controller 400, the double deadband droop controller 300, and the load compliance dispatch controller 200, while referred to in this figure as controllers, may also be considered control loops, controller stages, or control stages. In some embodiments, the droop controller 400, the double deadband droop controller 300, and the load compliance dispatch controller 200 are control loops of a single controller. However, for clarity the illustrated embodiment refers to each control loop as a controller. In some embodiments, the controllers may comprise a processor and storage media. The controllers may be software modules stored on memory to be executed by the processor.

The IED 118 may comprise a power sensor 104, a frequency sensor 106, and a communication interface 102. A system bus may facilitate communication and/or interaction between the components. The IED 118 may control the generator 110 based on load changes. As shown, each generator (e.g., generator 110, generator 112) may be controlled by an IED (e.g., IED 118, IED 120).

The IED 118 may obtain power system signals from portions of the electric power delivery system 100 either directly (as illustrated) or indirectly from various devices such as merging units. Electric power system signals may be obtained using instrument transformers such as a plurality of current transformers (CTs) 114 potential transformers (PTs) 116 and the like. The IED 118 may use power system signals such as signals representing current and voltage to determine a target power output of the generator 110.

The communication interface 102 may facilitate communications with various other devices either directly or via a network. For example, the communication interface 102 may facilitate communications with the generator 110. Suitable networks for configuration and/or use as described herein include one or more local area networks, wide area networks, metropolitan area networks, Internet or IP networks, such as the World Wide Web, a private Internet, a secure Internet, a value-added network, a virtual private network, an extranet, an intranet, or even stand-alone machines which communicate with other machines by physical transport of media. In particular, a suitable network may be formed from parts or entireties of two or more other networks, including networks using disparate hardware and network communication technologies. One suitable network includes a server and several clients; other suitable networks may contain other combinations of servers, clients, and/or peer-to-peer nodes, and a given computer system may function both as a client and as a server.

The IED 118 may include three controllers also referred to as control loops. The controllers may be implemented as a field-programmable gate array (FPGA), microprocessor, application specific integrated circuit, or the like.

The storage media 108 may be a repository for computer instructions, data, settings, samples, and the like. The storage media 108 may include a single or multiple physical storage media, one or more of which may be packaged with a processor. The storage media 108 may include, but is not limited to: hard drives, floppy diskettes, optical disks, CD-ROMs, DVD-ROMs, ROMs, RAMs, EPROMs, EEPROMs, magnetic or optical cards, solid-state memory devices, or other types of media/computer-readable media suitable for storing electronic instructions. Data on the storage media 108 may include data from the power sensor 104, frequency sensor 106, and data generated by the TED 118.

The load compliance dispatch controller 200, double deadband droop controller 300, and droop controller 400 are the controller stages of the TED 118. Each of the controller stages provides the TED 118 with an additional feedback loop, the combination of the controller stages facilitates a fast and reliable response to a load change.

The load compliance dispatch controller 200 may receive frequency measurements and power measurements of a genset engine and determine a dispatch adjustment comprising a frequency setpoint based on the frequency measurements and power measurements. A genset is a combination of a prime mover, (typically an engine), and an alternator or generator. The load compliance dispatch controller 200 may send the dispatch adjustment to the double deadband droop controller 300. The double deadband droop controller 300 may include a double deadband droop filter to periodically generate a pulse based on the frequency setpoint and the power measurements. The communication interface 102 may update an inner loop setpoint based on the pulse and send the inner loop setpoint to the droop controller 400. The droop controller 400 may alter a target fuel valve reference based on the inner loop setpoint generated by the second controller and a fuel valve droop. The target fuel valve reference may be sent to a fuel valve servo 412 of the generator 110 to adjust the power output.

The controllers may each have a different cycle speed. For instance, the droop controller 400 may update the target fuel valve reference more frequently than the double deadband droop controller 300 updates the inner loop setpoint, and the double deadband droop controller 300 may update the inner loop setpoint more frequently than the load compliance dispatch controller 200 updates the frequency setpoint. For example, in some embodiments, the load compliance dispatch controller 200 has a cycle speed of 2 seconds, the double deadband droop controller 300 has a cycle speed of 1 second, and the droop controller 400 has a cycle speed of 0.1 seconds.

The droop controller 400, the double deadband droop controller 300, and the load compliance dispatch controller 200 can be implemented identically on all local generator controllers without the controls interfering with each other. The droop controller 400, the double deadband droop controller 300, and the load compliance dispatch controller 200 are cascading frequency loops. The droop controller 400 is considered an inner loop as it updates the fastest and is directly controlling the generator 110. The double deadband droop controller 300 is a middle loop as it isolates the droop controller 400 from the load compliance dispatch controller 200 and updates slower than the droop controller 400 but faster than load compliance dispatch controller 200. The load compliance dispatch controller 200 is an outer loop that interfaces with the electric power delivery system 100 to receive wide-area feedback. Wide-area feedback may include the current operating frequency of the electric power delivery system 100, power levels of the generators in the electric power delivery system 100, power available from the generators in the electric power delivery system 100, and load sharing scheme of the electric power delivery system 100. Load sharing schemes may include an equal percentage loading scheme where each generator shares the load, or machine exercising where one or more generators are operated above a typical power level for a defined duration.

The three controllers provide redundancy. The TED 118 has no single point of failure and degrades gracefully as failures combine. Each of the three cascaded frequency loops perform part of the control, but each can still maintain system load share to some degree without the others. For example the outer loop (i.e., load compliance dispatch controller 200) can fail and the droop controller 400 may continue to provide a target fuel valve reference to the generator 110. The double deadband droop controller 300 can also fail and the droop controller 400 may continue to provide a target fuel valve reference to the generator 110. As each outer loop fails the power systems load balance and or steady-state frequency response is deprecated, yet the power system continues, resulting in a very robust control system. Additionally, taking a machine out of load share and into local power dispatch (i.e., Local Control mode where the dispatch setpoint is set by the operator at the machine's local interface) does not change its transient response. This is because transients are primarily defined by the inner loops (e.g. the middle loop and inner loop). The embodiments herein are less sensitive than existing methods to load composition and impedance changes.

Additionally, the TED 118 may be protocol independent. An associated area control/load share algorithm may be executed by the TED 118 or a remote controller, because there is no integral term. Each TED may receive duplicate information and can have a duplicate copy of the load share section of the control algorithm. Thus, this design allows for operators to dispatch machines locally or remotely. Additionally, embodiments herein adhere to grid interconnection requirements for large scale generators. This allows parallel engines to operate while connected to a bulk electric grid. Embodiments herein may be used with prime movers including reciprocating diesel, reciprocating gas, single shaft industrial turbine, multi-shaft (aeroderivative) turbine, water turbine, steam turbine, or any combination thereof.

Figure 2:
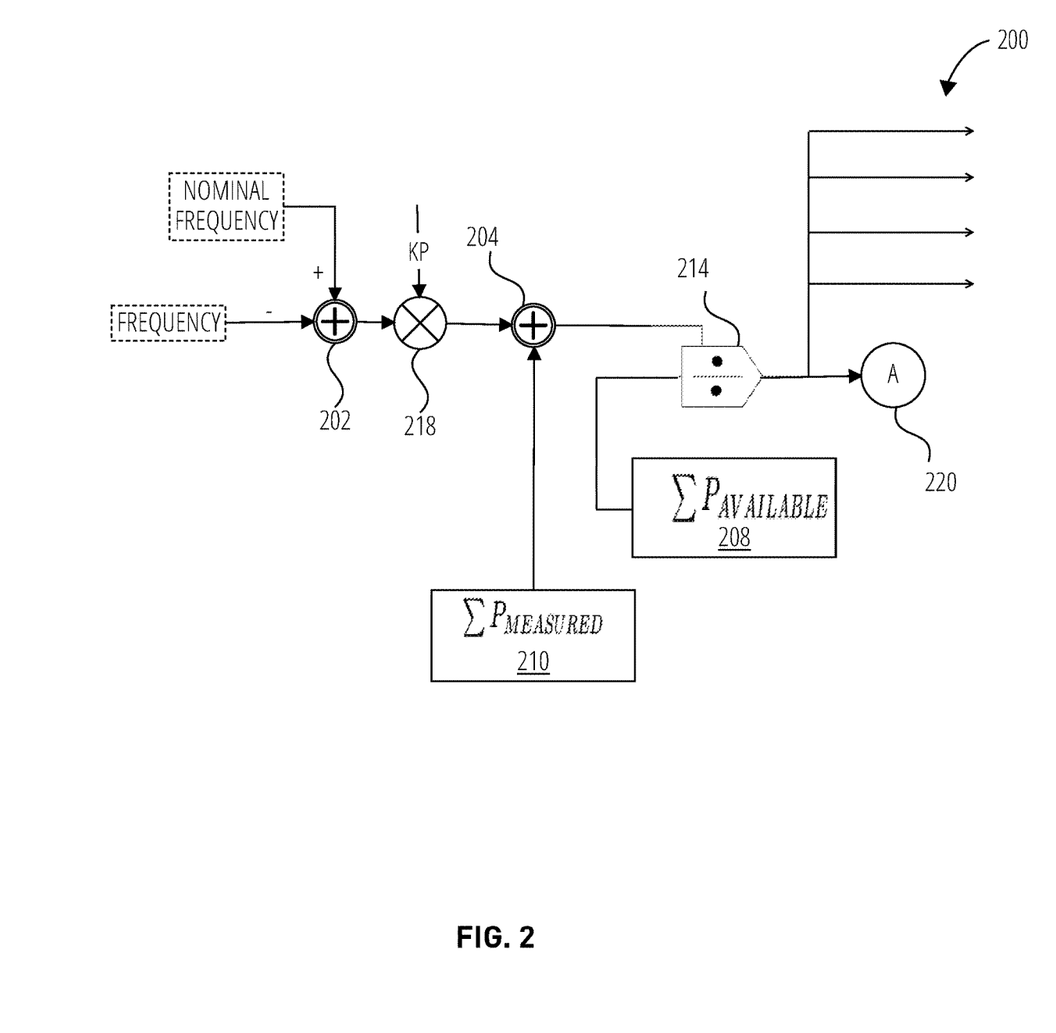
FIG. 2 illustrates a load compliance dispatch controller in accordance with one embodiment.

FIG. 2 illustrates a schematic block diagram of the load compliance dispatch controller 200 of FIG. 1. The load compliance dispatch controller 200 is considered an outer control loop because it is slower than the other controllers and interfaces with wide-area feedback mechanisms. As explained in more detail below, the load compliance dispatch controller 200 receives frequency measurements and power measurements of a genset engine and determines a dispatch adjustment comprising a frequency setpoint based on the frequency measurements and power measurements. The load compliance dispatch controller 200 determines frequency and power dispatch, eliminates steady-state frequency error, and provides refined control to enhance fuel efficiency, minimize maintenance, and improve operating envelope.

The illustrated load compliance dispatch controller 200 may comprise a subtraction block 202 with an inverting input comprising a measured frequency of the genset engine, a non-inverting input comprising a nominal frequency (e.g., set to 60), and a gain corresponding to a load compliance factor (Kp). The load compliance is a measurable quantity that quantifies the change in load as a function of system frequency. The value of load compliance ranges from 1%/1% (change in power over change in frequency) to 30%/1% (change in power over change in frequency). The value of the load compliance gain can be calculated based upon load composition. Because load compliance is measurable, a user may simply set the value rather than tuning the load compliance dispatch controller 200. Reducing or eliminating tuning of control loops can result in a simpler set up. The compliance dispatch controller 200 subtracts the measured frequency from the nominal frequency. This difference may be multiplied by a Kp coefficient (load compliance factor) using a multiplier 218 to weight the deviation of the measured system frequency from the nominal frequency. This output may be used as a load compliance value The load compliance dispatch controller 200 further comprises an adder 204. The adder 204 sums an output of the multiplication block 218 and a measured power state 210 to determine a total system load adjusted by load compliance. The measured power state 210 is determined by summing power measurements taken from each interconnected machine in the electric power delivery system 100. This term measures the electric power from the generator and the adder 204 injects it into the calculation. This means that the controls can react as fast as the electric power consumption changes instead of waiting for frequency decay before acting.

The load compliance dispatch controller 200 further comprises a divider 214 to divide an output (total system load adjusted by load compliance) of the adder 204 by an amount of power available 208 from the interconnected machines to provide an average dispatch value. The dispatch controller 200 may divide the present output from all the generators by the total generation capacity. This provides a per-unitized value for the network which may also be known as a usage percentage. This value represents the ideal per-unit dispatch value for all machines to achieve an equal percentage load share.

Figure 3:
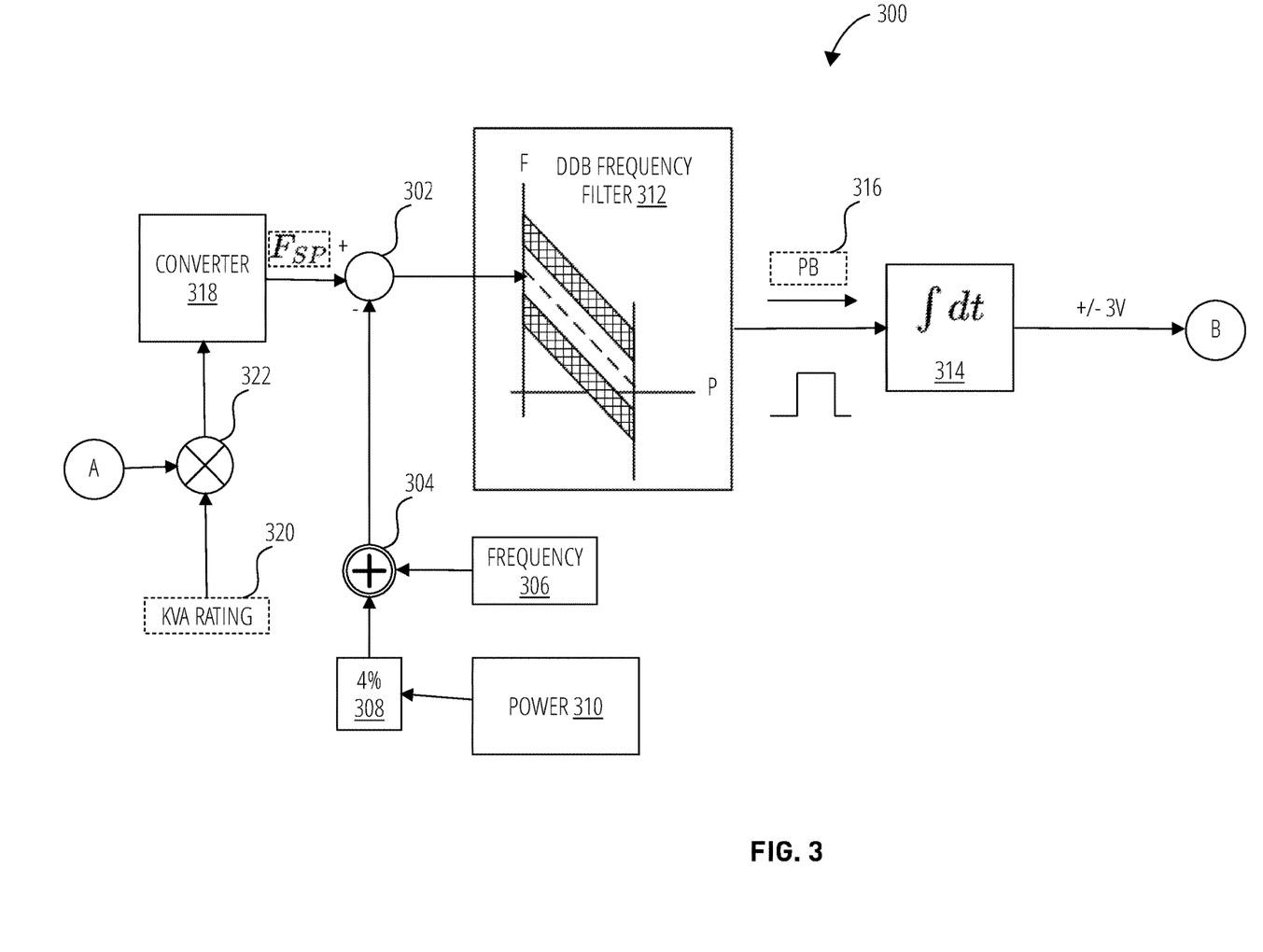
FIG. 3 illustrates a double deadband droop controller in accordance with one embodiment.

With reference to FIG. 3, on a per-machine basis, a multiplier 322 multiplies an output of the divider 214 by a kilo-volt-amperes (kVA) rating 320 of the genset engine resulting in a target power setpoint. That is, if this value is sent to multiple machines, the kVA rating may be unique for each machine. In some embodiments, A converter 318 may convert the target power setpoint into a target frequency setpoint.

The double deadband droop controller 300 (i.e., the middle loop) effectively decouples the dynamics of the droop controller 400 (i.e., the inner loop) from the load compliance dispatch controller 200 and wide area control. This decoupling allows the system to use wide-area feedback without introducing instability. This wide area control can take many forms. For example, the wide area control may indicate an equal percentage loading scheme. In the equal percentage loading scheme, each interconnected machine reports its present sourcing power level and its maximum steady-state capability. The load compliance dispatch controller 200 (e.g., outer loop controller) sums these values for all machines and calculates an overall percentage. This percentage is transmitted to the middle loop resulting in all machines sharing power at the same level.

The wide area control may initiate periodic machine exercising. Certain types of generators require periodic exercising. For example, diesel generators need to be operated above 80% power level periodically to heat their exhaust manifolds to sufficient temperatures to burn off products of incomplete combustion (wet stacking). The load compliance dispatch controller 200 may select a machine for exercising, ramp its dispatch percentage (using the signal shown at circle A 220) up to 90% and dispatch the remaining machines to share the remaining load evenly.

Additionally, a steady-state frequency error can be counteracted by identifying the required power dispatch adjustment (using the droop slope) to bring the system frequency back within tolerances following a load change. With all three loops working together, a power system can be commissioned with no tuning (only a few measured transients and deriving settings from them) and run with dissimilar equipment while maintaining rapid response to transients and minimal steady-state frequency deviation. Further, if communication between the outer and middle loop fails, the system is still stable and shares well. The only degradation is that a steady-state frequency deviation may be observed. If the middle loop also fails, the machines will still load share, although some nonlinearities may be observed. Taking a machine out of load share and into local power dispatch does not change its transient response. This is because transients are primarily defined by the inner loops (e.g., the middle loop 300 and the inner loop 200).

FIG. 3 illustrates a schematic block diagram of the double deadband droop controller 300 of FIG. 1. The double deadband droop controller 300 also referred to as the middle feedback loop, receives the frequency setpoint from the load compliance dispatch controller 200 and shapes it for the droop controller 400 (i.e., inner feedback loop). In some embodiments, the double deadband droop controller 300 also decouples dynamics of the load compliance dispatch controller 200 and the droop controller 400 to enhance and/or ensure stability.

Because directly integrating the frequency error to provide machine dispatch adjustment generally leads to instability in tightly coupled power systems, the double deadband droop controller 300 provides a dispatch shaper. This dispatch shaper can be implemented in various ways. For example, the double deadband droop controller 300 may comprise one or more of a double deadband filter to provide rapid response to disturbances, hysteresis (in the form of pulse repetition time) to decouple the dynamics and ensure stability, elevator motion (e.g., ramped) to minimize the transient response of each pulse, and droop to compensate for nonlinearities of the inner feedback loop (i.e., droop controller 400).

As illustrated, in some embodiments the double deadband droop controller 300 comprises a droop controller 308 that scales a power measurement 310 by a droop slope to determine a scaled reference. In some embodiments, the droop slope may be 4%. An adder 304 sums the scaled reference and the frequency measurements 306 to determine a frequency droop. A subtractor 302 reduces the frequency setpoint by the frequency droop. The output of the subtractor 302 is sent to a double deadband (DDB) frequency filter 312.

The DDB frequency filter 312 uses thresholds to linearize the dispatch adjustments. For example, the DDB frequency filter 312 may use hysteresis. Hysteresis is a description of a system whose characteristic is that the output only changes direction if the input's change of direction exceeds a minimum threshold. Hysteresis is typically employed to avoid excessive cycling of actuators. For example, a thermostat will turn heat on once the room temperature is greater than 2 degrees below the setpoint, then keep the heat on until the temperature exceeds the setpoint by 2 degrees. This way the furnace is not constantly turning on and off but still maintains the desired temperature within 2 degrees. In some embodiments, the DDB frequency filter 312 may employ a deadband. A deadband provides no output as long as the input is within a pre-defined band of the setpoint. For example, a water tank level control will maintain the water level between two points. When the level falls below the lower point, the feedpump will immediately begin adding water. If the level rises above the higher point, a discharge valve will immediately open.

In some embodiments, the DDB frequency filter 312 may comprise a deadband pulse generator. The deadband pulse generator achieves the benefits of both a hysteresis controller and deadband. When the input exceeds a certain threshold, a pulse is generated. The area of this pulse can then be integrated by an integrator 314, resulting in a ramp change of the output (i.e., inner loop setpoint). Setting a pulse repeat time achieves a temporal decoupling that prevents instabilities. For example, a generator frequency controller would initiate a pulse if the frequency error exceeds a minimum threshold, then the integration of the pulse would result in a smooth ramp change in the inner loop setpoint, bringing the system frequency back within tolerances.

A pushbutton 316 may be used to select Local Power Dispatch (ignore remote commands) or Remote (accept the remote dispatch commands into the integrator). The +/−3V represents a physical analog signal to communicates the desired frequency offset of the programmed droop curve in the governor. A traditional governor may include an rpm measurement, gain, and fuel valve feedback. Local Power Dispatch can be achieved in some embodiments by providing local control over the input to 314, in other embodiments by providing local control over the input to 312, and in other embodiments by providing local control over both 312 and 314 depending on the locally selected mode as required to support commissioning and test operations.

In some embodiments, the DDB frequency filter 312 may comprise two thresholds in each direction of a nominal setpoint. The nominal setpoint (e.g., the center of the deadband) is based on the desired frequency and the present power output of the generator. For example, the inner thresholds may be set at 0.1 Hz above and below a target frequency and the outer thresholds may be set at 0.5 Hz above and below the target frequency. In this example, a generator that is operating at 0.1 Hz to 0.5 Hz below the desired frequency at its power level would generate a pulse that would increase the inner loop setpoint by 0.1 Hz. The pulse would repeat again after a pre-set delay if the frequency still contained greater than 0.1 Hz deviation. If the generator were to operate at 0.5 Hz or more below the desired frequency, a pulse to increase the setpoint by 0.5 Hz would instead be generated. The durations of the pulses may be uniquely specified so that each pulse can be a different duration.

In some embodiments, the double deadband setpoints are chosen (e.g., not tuned) by identifying the measurement noise of the power and frequency transducers and setting the lower threshold slightly larger than the measurement noise (e.g., 0.5% to 2% of rated power). Similarly, pulse repetition timing may be set based on measured values. For example, to determine pulse repetition timing for instances where the inner thresholds are exceeded, a small pulse may be applied at various power levels and the decay time of the resulting transient is measured. The pulse repetition time may be set to be between 80% and 100% of this decay time based on desired response.

The larger deadband thresholds may be set based on desired response to larger transients (e.g., the thresholds may be set at 5% to 10% of rated power). To determine pulse repetition timing for instances where the outer thresholds are exceeded, large pulses may be applied, the transients recorded, and the pulse repetition time set to be between 80% and 100% of this decay time. Setting the pulse repetition times this way results in a control whereby setpoint changes are applied to a system that is effectively operating in steady state. The dynamics are temporally decoupled and no integral tuning is required.

The integrator 314 provides a ramped inner loop setpoint and the pulsed adjustments provide incremental changes in the ramp's slope. Further conditioning or path planning may be applied, in one embodiment, the ramping may provide elevator motion (e.g., accelerate-cruise-decelerate) when adjusting the inner loop setpoint. In another embodiment, a path that enforces continuous jerk (first time derivative of acceleration) may be applied. Thus, the integrator 314 and DDB frequency filter 312 change the output rate of change gradually. In terms of dynamic response, this method of adjusting the setpoint will result in a less severe dynamic response and minimal overshoot while achieving the desired output in comparable time.

In some embodiments, the double deadband droop controller 300 can use either frequency or RPM or a weighted average of both depending on what measurements are available. This may allow the double deadband droop controller 300 to survive failures in RPM toothwheel sensor. This is because the double deadband droop controller 300 can switch to stator measured electric frequency measure with minimal consequence.

The double deadband droop controller 300 sends the inner loop setpoint to the droop controller 400.

Figure 4:
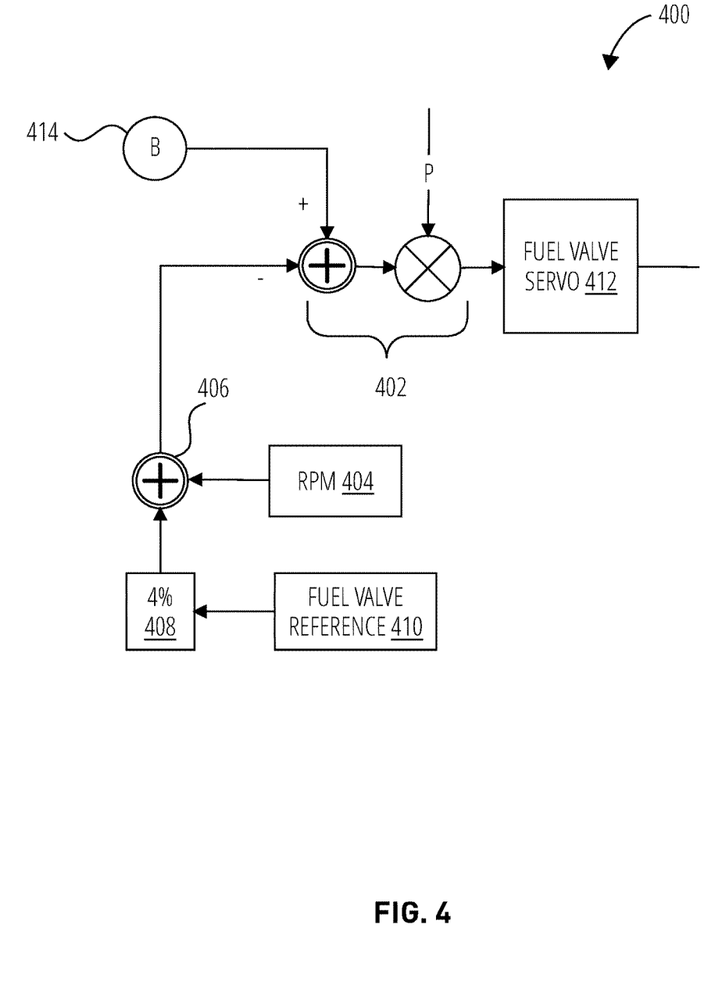
FIG. 4 illustrates a droop controller in accordance with one embodiment.

FIG. 4 illustrates a schematic block diagram of the droop controller 400 of FIG. 1. The droop controller 400 may receive the inner loop setpoint from the double deadband droop controller 300. The droop controller 400 may be used to directly control the fuel valve of an individual machine.

The individual machines may operate on a droop control scheme where machine dispatch (e.g., output of droop controller 400) involves two setpoints. The first setpoint is the no-load frequency. The second setpoint is the droop slope which relates by how much a load increase will lower the frequency (typically 4%, meaning that a change from 0% to 100% load will drop the frequency by 4%; e.g., from 60 Hz to 60 [Hz]*(1 [pu freq]−0.04 [pu freq/pu power]*1 [pu power])=57.6 Hz). This droop controller 400 does not require communication between controllers of different machines as it uses the system frequency and the droop curves to establish equivalent percentage of load share between interconnected machines. The droop controller 400 typically responds quickly and operates with good stability, but may result in a frequency deviation when loads change. Furthermore, as the droop controls are often implemented mechanically inside the machine, the steady-state response can tend to be nonlinear.

The droop controller 400 (i.e., inner frequency control loop or inner speed control) can be electromechanical, microprocessor based, hydraulic, fly-ball governor, or any combination thereof. Thus, the droop controller 400 works regardless of the fuel controls mechanism.

In the illustrated embodiment, the droop controller 400 comprises a droop control 408 that scales a power estimate (e.g., a fuel valve reference) by a droop slope to determine a scaled reference. In one embodiment, the power estimate can be derived from the present fuel valve reference 410. In another embodiment, the power estimate can be derived from measurements of electrical power at the machine terminals. An adder 406 sums the scaled power estimate and a RPM measurement 404 of a shaft of the genset engine to determine the fuel valve droop. The droop controller 400 further comprises logic 402 (e.g., subtraction block and a multiplier block) to calculate an error between the operational point (RPM minus fuel valve reference * a governor droop) and setpoint (B) 414 and perform subsequent multiplication of this error by a proportional term "P" to alter an output (i.e., target fuel valve reference) sent to the fuel valve servo 412. In other words, the droop controller 400 may be a traditional droop-enabled genset governor with input conditioned by setpoint (B). The governor droop gain may be the same as the slope in the DDB 312 (shown as 4% in 408), but may be different, nor does the governor steady state response need to be perfectly linear.

FIGS. 2-4 may be spilt into multiple controllers. For example, a centralized controller may comprise a first stage to receive frequency measurements and power measurements of a set of genset engines and determine a dispatch adjustment comprising a frequency setpoint based on the frequency measurements and power measurements. A plurality of distributed controllers may each control one of the multiple genset engines. Each distributed controller may comprise a second controller stage in communication with the first stage, the second stage may comprise a double deadband droop filter to periodically generate a pulse based on the frequency setpoint and the power measurements, the second controller may update an inner loop setpoint based on the pulse. Each distributed controller stage may also comprise a third stage in communication with the second stage, the third stage may alter a target fuel valve reference based on the inner loop setpoint generated by the second stage and a fuel valve droop.

Figure 5:
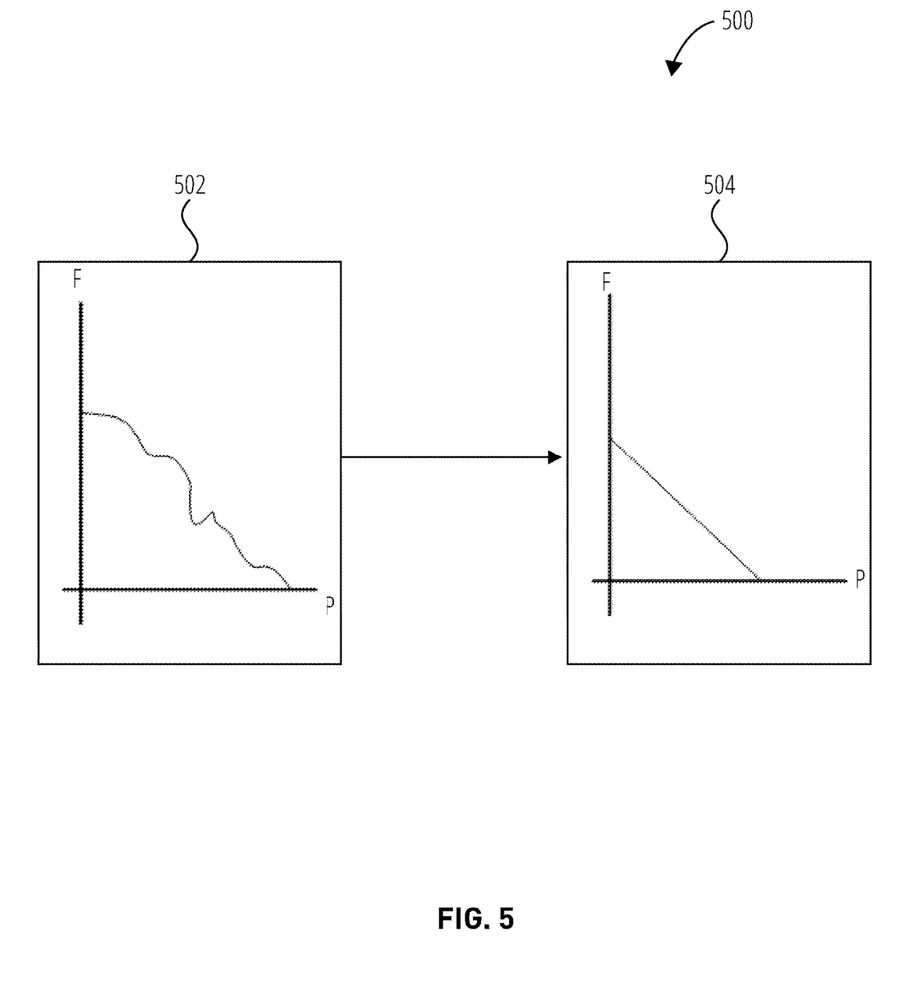
FIG. 5 illustrates two graphs demonstrating a linearizing affect caused by the double deadband droop controller on an output of the droop controller.

FIG. 5 illustrates two graphs 500 demonstrating a linearizing affect on the steady state operating point caused by the double deadband droop controller 300 on an output (i.e., target fuel valve reference) of the droop controller 400. The first graph 502 demonstrates the non-linearity of the output with the droop controller 400 alone. The second graph 504 demonstrates the resulting steady-state linearity of the output when the droop controller 400 is used in combination with the double deadband droop controller 300.

The foregoing specification has been described with reference to various embodiments, including the best mode. However, those skilled in the art appreciate that various modifications and changes can be made without departing from the scope of the present disclosure and the underlying principles of the invention. Accordingly, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "coupled," "couple," and any other variation thereof are intended to cover a physical connection, an electrical connection, a magnetic connection, an optical connection, a communicative connection, a functional connection, and/or any other connection.

Principles of the present disclosure may be reflected in a computer program product on a tangible computer-readable storage medium having computer-readable program code means embodied in the storage medium. Any suitable computer-readable storage medium may be utilized, including magnetic storage devices (hard disks, floppy disks, and the like), optical storage devices (CD-ROMs, DVDs, Blu-Ray discs, and the like), flash memory, and/or the like. These computer program instructions may be loaded onto a general purpose computer, special purpose computer, or other programmable data processing apparatus to produce a machine, such that the instructions that execute on the computer or other programmable data processing apparatus create means for implementing the functions specified. These computer program instructions may also be stored in a computer-readable memory that can direct a computer or other programmable data processing apparatus to function in a particular manner, such that the instructions stored in the computer-readable memory produce an article of manufacture including instruction means which implement the function specified. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified.

Principles of the present disclosure may be reflected in a computer program implemented as one or more software modules or components. As used herein, a software module or component (e.g., engine, system, subsystem) may include any type of computer instruction or computer-executable code located within a memory device and/or computer-readable storage medium. A software module may, for instance, comprise one or more physical or logical blocks of computer instructions, which may be organized as a routine, a program, an object, a component, a data structure, etc., that perform one or more tasks or implement particular data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Suitable software to assist in implementing the invention is readily provided by those of skill in the pertinent art(s) using the teachings presented here and programming languages and tools, such as Java, Pascal, C++, C, database languages, APIs, SDKs, assembly, firmware, microcode, and/or other languages and tools.

Embodiments as disclosed herein may be computer-implemented in whole or in part on a digital computer. The digital computer includes a processor performing the required computations. The computer further includes a memory in electronic communication with the processor to store a computer operating system. The computer operating systems may include, but are not limited to, Microsoft® Windows®, Apple® MacOS®, Disk Operating system (DOS), UNIX, IRJX, Solaris, SunOS, FreeBSD, Linux®, QNX®, ffiM® OS/2®, and so forth. Alternatively, it is expected that future embodiments will be adapted to execute on other future operating systems.

In some cases, well-known features, structures, or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

While the principles of this disclosure have been shown in various embodiments, many modifications of structure, arrangements, proportions, elements, materials, and components, used in practice, which are particularly adapted for a specific environment and operating requirements, may be used without departing from the principles and scope of this disclosure. These and other changes or modifications are intended to be included within the scope of the present disclosure.

The scope of the present invention should, therefore, be determined only by the following claims.

What is claimed is:

1. A device to control a genset engine, the device comprising:
   a first controller to receive frequency measurements and power measurements of a set of gensets and determine a dispatch adjustment comprising a frequency setpoint based on the frequency measurements and power measurements;
   a second controller in communication with the first controller, the second controller comprising a double deadband droop filter to periodically generate a pulse based on the frequency setpoint and the power measurements, the second controller to update an inner loop setpoint based on the pulse; and
   a third controller in communication with the second controller, the third controller to alter a target fuel valve reference based on the inner loop setpoint generated by the second controller and a fuel valve droop.

2. The device of claim 1, wherein the third controller updates the target fuel valve reference more frequently than the second controller updates the inner loop setpoint, and the second controller updates the inner loop setpoint more frequently than the first controller updates the frequency setpoint.

3. The device of claim 1, wherein the third controller is a governor.

4. The device of claim 1, wherein the third controller comprises a traditional droop controller with an input conditioned by a setpoint.

5. The device of claim 1, wherein the first controller determines the dispatch adjustment based on wide-area feedback.

6. The device of claim 1, wherein the first controller comprises:
   logic to calculate a deviation of measured system frequency from nominal frequency weighted by a coefficient of system load compliance with respect to frequency to determine a load compliance value;
   an adder to sum the load compliance value and the power measurements to determine a total system load adjusted by the load compliance value;
   a divider to divide the total system load adjusted by load compliance by a total online generation capacity to provide a dispatch setpoint;
   a multiplier to multiply the dispatch setpoint by a kilo-volt-amperes (kVA) rating of a genset engine.

7. The device of claim 1,
   wherein the double deadband droop filter comprises two inner thresholds and two outer thresholds, wherein the two inner thresholds are between the two outer thresholds, and wherein a nominal setpoint based on the desired frequency and the present power output of the generator is between the two inner thresholds with a nominal setpoint between,
   wherein the two inner thresholds are setpoints of the double deadband droop filter are selected based on measurement noise in the frequency measurements and power measurements, and
   wherein the two outer thresholds are based on a percentage of rated power of a genset engine.

8. The device of claim 7, wherein the second controller further comprises:
   a droop control that scales the power measurements by a droop slope to determine a scaled reference;
   an adder to sum the scaled reference and the frequency measurements to determine a frequency droop;
   a subtractor to reduce the frequency setpoint by the frequency droop,
   wherein the double deadband droop filter determines if a subtractor output exceeds either the two inner thresholds or the two outer thresholds, and generates the pulse if a threshold is exceeded; and
   an integrator to integrate the pulse resulting in a ramp change of the inner loop setpoint.

9. The device of claim 1, wherein a pulse repetition time is set between 80% and 100% of decay time of a transient resulting from the pulse.

10. An electric power delivery system comprising:
    multiple genset engines; and
    multiple controllers, one distributed controller to control each of the multiple genset engines, and one centralized controller,
       the centralized controller comprising a first stage to receive frequency measurements and power measurements of a set of genset engines and determine a dispatch adjustment comprising a frequency setpoint based on the frequency measurements and power measurements;
       each distributed controller comprising:
          a second stage stage in communication with the first stage, the second stage comprising a double deadband droop filter to periodically generate a pulse based on the frequency setpoint and the power measurements, the second controller to update an inner loop setpoint based on the pulse; and
          a third stage in communication with the second stage, the third stage to alter a target fuel valve reference based on the inner loop setpoint generated by the second stage and a fuel valve droop.

11. The system of claim 10, wherein the third stage updates the target fuel valve reference more frequently than the second stage updates the inner loop setpoint, and the second stage updates the inner loop setpoint more frequently than the first stage updates the frequency setpoint.

12. The system of claim 10, wherein the third stage comprises:
    a droop control that scales a present fuel valve reference by a droop slope to determine a scaled reference;
    an adder to sum the scaled reference and a rotations per minute measurement of a shaft of the genset engine to determine the fuel valve droop; and
    logic to alter the target fuel valve reference, by subtracting the inner loop setpoint from the fuel valve droop.

13. The system of claim 10, wherein the first stage comprises:
    logic to calculate a deviation of measured system frequency from nominal frequency weighted by a coefficient of system load compliance with respect to frequency to generate a load compliance value;
    an adder to sum the load compliance value and the power measurements to determine a total system load adjusted by load compliance;
    a divider to divide the total system load adjusted by load compliance by a total online generation capacity to provide an average dispatch value;
    a multiplier to multiply the average dispatch value by a kilo-volt-amperes (kVA) rating of the genset engine; and
    a converter to change a multiplier output into units of frequency to determine the dispatch adjustment.

14. The system of claim 10, wherein the second stage further comprises:
    a droop control that scales the power measurements by a droop slope to determine a scaled reference;
    an adder to sum the scaled reference and the frequency measurements to determine a frequency droop;
    a subtractor to reduce the frequency setpoint by the frequency droop,
    wherein the double deadband droop filter determines if a subtractor output exceeds either two inner thresholds or two outer thresholds, and generates the pulse if a threshold is exceeded; and
    an integrator to integrate the pulse resulting in a ramp change of the inner loop setpoint.

15. The system of claim 10, wherein the first stage determines the dispatch adjustment based on wide-area feedback.

16. A method for controlling a genset engine, the method comprising:
    determining a dispatch instruction for a genset engine based on a load composition, the dispatch instruction comprising a dispatch setpoint based on frequency measurements and power measurements;
    reducing the dispatch setpoint based on a droop rate and the frequency measurements and power measurements;
    filtering the reduced dispatch instruction with a double deadband droop filter;
    periodically generating a pulse based on an output of the of the double deadband droop filter to update an inner loop setpoint based on the pulse; and
    determining a target fuel valve reference based on the inner loop setpoint and a fuel valve droop.

17. The method of claim 16, wherein the target fuel valve reference is updated more frequently than the inner loop setpoint, and the inner loop setpoint is updated more frequently than the dispatch setpoint.

18. The method of claim 16, wherein determining the target fuel valve comprises:
scaling a current fuel valve reference by a droop slope to determine a scaled reference;
adding the scaled reference and a rotations per minute measurement of a shaft of the genset engine to determine the fuel valve droop; and
determining the target fuel valve reference by calculating an error between the inner loop setpoint and the fuel valve droop, and multiplying the error by a proportional term.

19. The method of claim 16, wherein determining the dispatch instruction comprises:
calculating a deviation of measured system frequency from nominal frequency weighted by a coefficient of system load compliance with respect to frequency to determine a load compliance value;
adding the load compliance value and the power measurements to determine a total system load adjusted by the load compliance value;
dividing the total system load adjusted by load compliance by a total online generation capacity to provide an average dispatch value; and
multiplying the average dispatch value by a kilo-volt-amperes (kVA) rating of the genset engine.

20. The method of claim 19, further comprising converting a multiplier output into units of frequency to determine the dispatch instruction.

21. The method of claim 16, wherein to update the inner loop setpoint, the method further comprises:
scaling the power measurements by a droop slope to determine a scaled reference;
adding the scaled reference and the frequency measurements to determine a frequency droop;
reducing the dispatch setpoint by the frequency droop,
wherein the double deadband droop filter determines if a reduced frequency setpoint output exceeds either two inner thresholds or two outer thresholds, and generates the pulse if a threshold is exceeded; and
integrating the pulse resulting in a ramp change of the inner loop setpoint.

\* \* \* \* \*